United States Patent [19]

Takeuti et al.

[11] Patent Number: 4,458,099

[45] Date of Patent: Jul. 3, 1984

[54] THREE-PHASE COMBINED TYPE GAS INSULATED ELECTRICAL APPARATUS

[75] Inventors: Susumu Takeuti; Minor Sakaguchi; Takanobu Aoyama; Kazuaki Oishi; all of Hitachi, Japan

[73] Assignee: Hitachi, Ltd., Tokyo, Japan

[21] Appl. No.: 245,513

[22] Filed: Mar. 19, 1981

[51] Int. Cl.³ .......................... H02G 5/06; H01B 9/06
[52] U.S. Cl. .................... 174/27; 174/14 R; 174/35 CE; 174/72 B; 174/99 E
[58] Field of Search ............ 174/14 R, 16 B, 27, 174/35 CE, 71 B, 72 B, 99 B, 99 E; 307/89, 90, 91, 147; 361/333, 341, 342

[56] References Cited

U.S. PATENT DOCUMENTS

| | | | |
|---|---|---|---|
| 2,874,207 | 2/1959 | Schymik | 174/99 E |
| 3,020,329 | 2/1962 | Deans | 174/35 CE X |
| 3,546,358 | 12/1970 | Pohl | 174/35 CE |
| 3,751,578 | 8/1973 | Hoffmann | 174/16 B X |
| 4,110,551 | 8/1978 | Cookson | 174/14 R X |

FOREIGN PATENT DOCUMENTS

| | | | |
|---|---|---|---|
| 2211987 | 9/1973 | Fed. Rep. of Germany | 174/14 R |
| 50-40576 | 12/1975 | Japan | 174/35 CE |
| 52-71649 | 6/1977 | Japan | 307/147 |
| 599305 | 3/1978 | U.S.S.R. | 174/27 |

OTHER PUBLICATIONS

International Application (PCT), WO79/00607, published Aug. 23, 1979, Knudsen et al.
*The Electric Journal*, vol. 25, No. 3, Mar. 1928, pp. 133–135.

*Primary Examiner*—Laramie E. Askin
*Attorney, Agent, or Firm*—Antonelli, Terry & Wands

[57] ABSTRACT

A three-phase combined type gas insulated bus is disclosed which comprises at least one eddy current conductor for passing the eddy current caused secondarily by the current flowing in high voltage conductors, thus solving the problem of a newly-found phenomenon that the temperature of a sealed casing increases by the flow of the eddy current. This eddy current conductor is made of such a material of good electrical conductivity as aluminum or copper. Even in the case where the sealed casing is reduced in diameter to such an extent as to pose a problem of temperature increase by the eddy current flow, the eddy current is reduced or completely eliminated in the best case, so that the sealed casing can be made of a low cost soft steel.

12 Claims, 13 Drawing Figures

THREE-PHASE COMBINED TYPE GAS INSULATED ELECTRICAL APPARATUS

BACKGROUND OF THE INVENTION

The present invention relates to a three-phase combined type gas insulated electrical apparatus comprising a sealed metal casing in which electrical conductors for three phases are collectively arranged.

Generally, a gas insulated electrical apparatus comprises a metal cylinder-shaped casing filled with an insulating gas such as SF6 gas and high voltage electrical conductors arranged within the casing along the axis thereof. A gas insulated circuit breaker or a gas insulated bus is known as such a type of apparatus.

The diameter of the cylinder-shaped casing of this type of apparatus is determined by the distance of electrical insulation between the high voltage electrical conductor and the cylinder-shaped casing. Another factor which must be taken into consideration in determining the diameter of the cylinder-shaped casing is the fact that the increase of the temperature of the casing is limited in many cases. As an example, a non-magnetic material is used for part of the circumferential portion of the cylinder-shaped casing. Japanese Patent Publication No. 40576/75, for instance, discloses an apparatus in which a non-magnetic material such as aluminum is used as part of the cylinder-shaped iron casing in order to reduce the iron loss due to the magnetic field caused by the current flowing in the high voltage electric conductors, thus preventing the casing from increasing in temperature.

If a three-phase combined type gas insulated bus of 500 KV in rated voltage and 8000 A in rated current is fabricated according to the specification for application of this art, however, an outer diameter of the cylinder-shaped casing is enlarged to such an extent as about 1800 mm. This figure does not make use of the advantage that the use of SF6 gas or the like superior in insulating characteristics shortens the insulation distance.

SUMMARY OF THE INVENTION

Accordingly, it is an object of the present invention to provide a three-phase combined type gas insulated electrical apparatus including a cylinder-shaped sealed casing that is smaller in diameter.

Another object of the present invention is to provide a three-phase combined type gas insulated electrical apparatus in which the sealed casing is prevented from an abnormal temperature increase which otherwise might be caused by magnetic fluxes induced by the current flowing in the high voltage conductors.

According to the present invention, a three-phase combined type gas insulated electrical apparatus comprises eddy current passing conductors of good electrical conductivity such as aluminum or copper mounted on the inner wall of the sealed casing in view of the newly discovered fact that heat is caused by the eddy current flowing due to the magnetic field having a component perpendicular to the cylindrical surface of the sealed casing. By introducing the eddy current through the eddy current conductors, the sealed casing is relieved of the eddy current and therefore can be made of such a low-cost material as soft steel or stainless steel. Further, since the relief from the eddy current is attributable to the addition of the eddy current conductors, the diameter of the casing can be reduced to a length determined based on the requirement of only the insulation characteristic.

The present invention will find its applications to a three-phase combined type gas insulated bus, a gas circuit breaker or other gas insulation apparatus.

DESCRIPTION OF THE PREFERRED EMBODIMENTS

Figure 1:
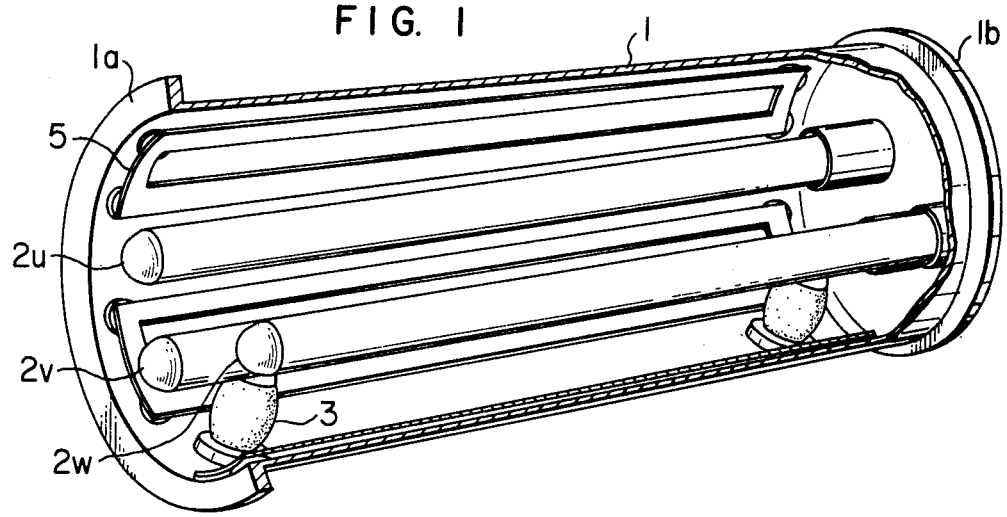
FIG. 1 is a partly-cutaway perspective view of a three-phase combined type gas insulated bus according to an embodiment of the present invention.

A three-phase combined type gas insulated bus making up an example of a three-phase combined type gas insulated electrical apparatus is shown in FIG. 1.

Figure 5:
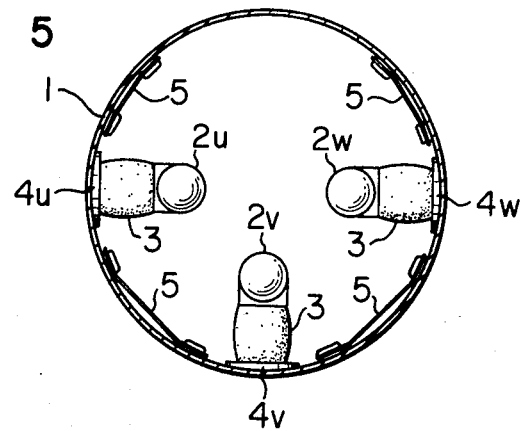
FIG. 5 is a sectional view of the three-phase combined type gas insulated bus shown in FIG. 1.

A cylindrical casing 1 has flanges 1a and 1b at the axial ends thereof by which the casing 1 is coupled hermetically to another casing or cover (not shown), thus forming a hermetic internal space. This internal space is filled with SF6 gas under a pressure of, say, 2.5 kg/cm$^2$. The casing 1 is made of stainless steel, a low-alloy steel or the like. The casing 1 contains therein three-phase AC high voltage conductors 2U, 2V and 2W arranged at the apexes of a triangle such as an equilateral triangle. These high voltage conductors have axes along the same direction as the axis of the casing 1. The high voltage conductors are secured by insulating supports 3 at intervals of an appropriate axial length. As shown in FIG. 5, an end of each insulating support 3 is secured to the seats 4U, 4V and 4W welded to the inner wall of the casing 1, and the other end thereof supports the high voltage conductors 2U, 2V and 2W, respectively.

An eddy current conductor 5 is arranged between the seats 4U and 4V and another eddy current conductor 5 between 4V and 4W along the inner wall of the casing 1. Each eddy current conductor 5 is made of a material of good electric conductivity such as copper or aluminum having a small electric resistance. Further, two similar eddy current conductors 5 are also provided in similar manner between the seats 4U and 4W.

The gas insulated bus constructed as described above is more compact and lower in weight than conventional gas insulated buses of the same ratings. In the case where a gas insulated bus of 275 KV in rated voltage and 8000 A in rated current is constructed with a casing 1 of stainless steel, for instance, the inner diameter of the conventional apparatuses of 1800 mm can be reduced to 1200 mm and the weight of the conventional apparatuses can be reduced by about 50% according to the present invention. If a gas insulated bus is made with an aluminum casing 1, on the other hand, the weight of the casing can be reduced by about 23% in spite of the inner diameter remaining the same. Also, in the case where a gas insulated bus of 500 KV in rated voltage and 12000 A in rated current is made with a stainless steel casing 1, the inner diameter of the conventional apparatuses may be reduced to 1500 mm and the weight of the casing may be reduced by about 39% according to the present invention.

The above-mentioned successful decrease of the inner diameter and weight of the casing 1 is not attributable merely to the reduction in the distance of electrical insulation but to the newly-discovered phenomenon and a solution against it as described below.

Figure 2:
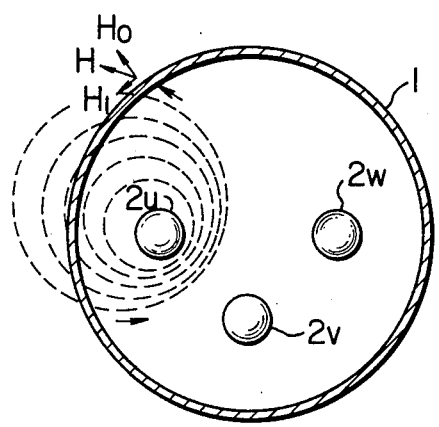
FIGS. 2 to 4 are schematic diagrams for explaining the new phenomenon discovered as a basis of the present invention.
Figure 3:
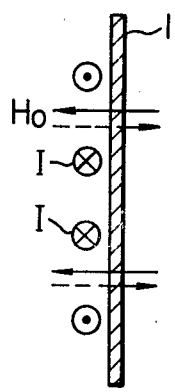

The phenomenon newly discovered will be described. When three-phase AC currents Iu, Iv and Iw flow in the three-phase high voltage conductors 2U, 2V and 2W respectively, these currents cause a magnetic field H as shown in FIG. 2 around the respective high voltage conductors. In view of the fact that the three-phase high voltage conductors are arranged substantially at the apexes of an isosceles triangle, the magnetic field H is considered to have a vertical component $H_0$ perpendicular to the surface of the casing 1 and a horizontal component $H_1$ parallel to the surface of the casing 1. The vertical component $H_0$ generates a current I in the casing 1 which cancels the vertical component $H_0$ as shown in FIG. 3. As seen from FIG. 4, when the casing 1 is viewed as a whole, the directions of adjacent currents I are opposite to each other so as to cancel each other causing the resultant eddy current $I_E$. This eddy current $I_E$, in turn, causes the local heating of that part of the casing 1 which has a large vertical component $H_0$. This local heating is a problem that cannot be solved even by use of a non-magnetic material at part of the casing 1 and is a phenomenon which has not so far been known in the case of gas insulated buses of phase-separated construction. In the three-phase combined type of gas insulated buses developed in the past, the diameter of the casing 1 cannot be reduced to such an extent that the vertical component $H_0$ poses the heating problem for the casing 1. In the conventional apparatus, the casing 1 is heated mainly by the heat caused by the casing 1 surrounding the high voltage conductors. As compared with this heat, the other sources of heating the casing are negligible, and it appears that the newly-discovered heat source described above has not been known.

It should be noted that this new phenomenon has been discovered as a result of the present inventors having tried to reduce the diameter of the casing 1 to such an extent as to pose the aforementioned new problem.

The eddy current conductors 5 shown in FIGS. 1 and 5 are for leading the above-mentioned eddy current $I_E$. For this purpose, each conductor 5 is placed at a position within the casing 1 corresponding to the current $I_E$ in FIG. 4. With respect to the isosceles triangular array of conductors shown, it can be seen that the eddy current conductors are located in areas of the casing facing the two sides of the triangle that are of equal length, while a longitudinal gap is located in the portion facing the one unequal side. The conductor 5 is made of a material of good electrical conductivity i.e., small in electrical resistance, and therefore is heated very little by the leading of the eddy current $I_E$ therethrough. Thus the eddy current $I_E$ does not substantially increase the temperature of the casing 1. In this way, the eddy current flowing in the casing 1 can be maintained at very low level, so that the case 1 can be made of a non-conductive material such as stainless steel or a low alloy steel which is low in cost as compared with aluminum or the like.

Figure 4:
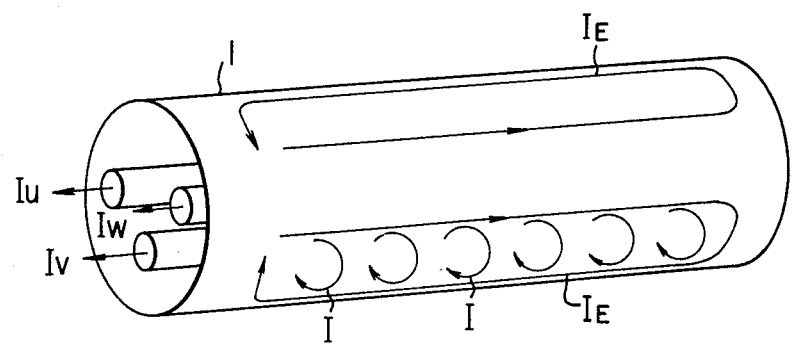
Figure 6:
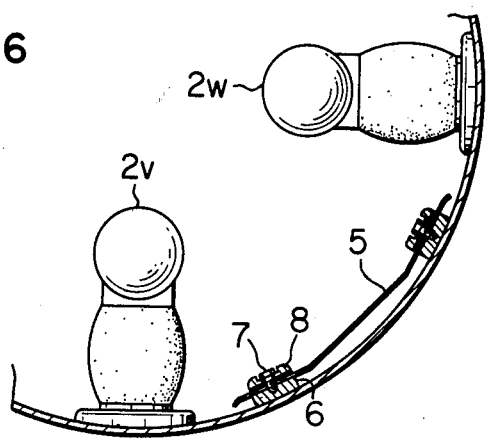
FIG. 6 is a diagram showing in an enlarged form the essential parts of the apparatus of FIG. 5.
Figure 7:
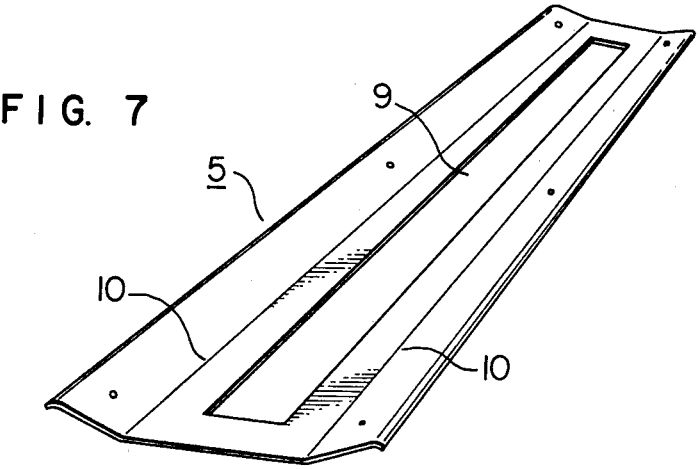
FIG. 7 is an enlarged perspective view of an eddy current conductor shown in FIG. 5.

The mounting structure of the conductors 5 will be described. As shown in FIG. 6, the seat 6 is securely welded to the inner wall of the casing 1. The seat 6 has an external thread into which a bolt 7 is to be screwed. The seat 6 also has a holder 8 on the upper surface thereof, which holder 8 is secured to the seat 6 by the bolt 7. A plate-shaped eddy current conductor 5 having a hole at two points thereof, for passing the bolt 7 therethrough, is held between the seats 6 and the holders 8. The eddy current conductor 5 has an opening 9 at the central part thereof as shown in FIG. 7 in view of the fact that the eddy current $I_E$ flows along the main path as shown in FIG. 4. The eddy current conductor 5 is formed with two bent portions 10 along the longitudinal axis thereof for increasing bend resistant strength of the conductor 5. In other embodiments, the conductor 5 may be formed arcuate to have substantially the same curvature as the inner wall of the casing 1, in which case the conductor 5 may be welded directly to the inner wall of the casing 1.

Figure 8:
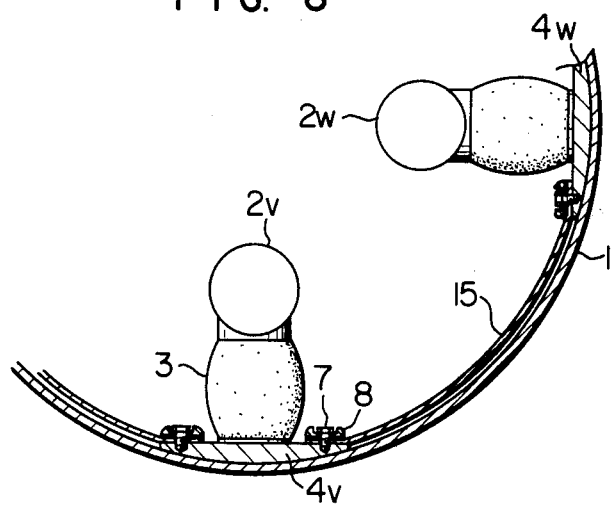
FIGS. 8 to 12 are sectional views of three-phase combined type gas insulated buses according to other embodiments of the present invention respectively.

The manner in which the eddy current conductor 15 is secured according to another embodiment is shown in FIG. 8. In order to secure an end of the insulating supports 3, the seats 4V and 4W welded to the inner wall of the casing 1 have an external thread for mating the bolt 7. The eddy current conductor 15 is arranged to cover the adjacent phase seats 4V and 4W, and secured to the seats 4V and 4W respectively by the bolt 7 through the holder 8. This embodiment eliminates the need of an exclusive seat for the eddy current conductor 15, and such a seat can be doubled as a seat for the insulating support 3.

Figure 9:
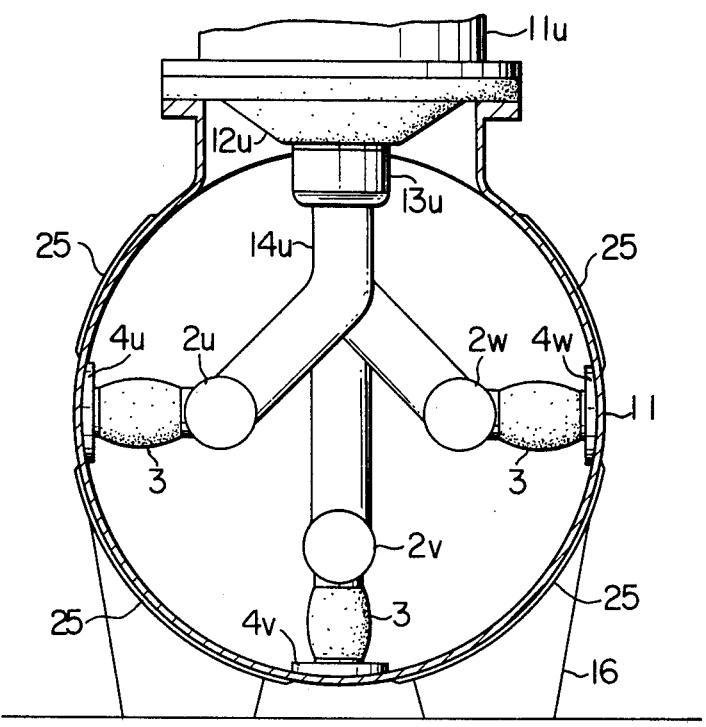

A three-phase combined type gas insulated bus according to still another embodiment is shown in FIG. 9. In many power substations, future equipment additions are taken into consideration. For example, a substation which initially operates at the rated current of 4000 A may change to 6000 A several years later. In such a case, it is quite uneconomical to replace all the devices with the change of current capacity. It is therefore desirable to design a substation in such a manner that the initial devices can be used also after the change in current capacity. The above-mentioned embodiments meet this demand. Some users may emphasize the need of shortening the period of power failure as far as possible at the time of change in current capacity. This requirement is satisfied by the embodiment illustrated in FIG. 9. The description below is based on the assumption that the initial rated current of 4000 A is changed to 6000 A.

The casing 11 is constructed of stainless steel to comply with the specification for the rated current of 4000 A. The construction of the high voltage conductors 2U, 2V and 2W and the insulating supports 3 is identical to that of those of the aforementioned embodiments. The gas insulated bus incorporated in the casing 11 is secured on an intended base by legs 16. The high voltage conductor 2U is connected to a branch conductor 14U secured by an insulating spacer 12U, 13U, which branch conductor 14U is in turn connected to a disconnecting switch 11U or the like (not shown). The diameter of the casing 11 is such that the temperature increase by the passage of the rated current 4000 A is sufficiently small. If the rated current value is changed to 6000 A, the construction within the casing 11 is not changed at all.

In other words, the construction of the apparatus including the current conduction area of the high voltage conductors 2U, 2V and 2W and the coefficient of thermal expansion due to a temperature increase are designed in anticipation of the change of the rated current. The diameter of the casing 11, however, is based on the specification for the rated current of 4000 A. In spite of this, the diameter thereof is not changed with the change in the rated current. This is attributable to the construction design in which eddy current conductors 25 of a good conductive material small in electrical resistance are closely attached onto the outer wall surface of the casing 11. The eddy current conductors 25 are constructed in a manner similar to those described with reference to FIG. 7, and secured at positions corresponding to the high voltage conductors 2U, 2V and 2W for respective phases along the outer peripheral wall surface of the casing 11.

According to this embodiment, part of the magnetic fluxes induced by the current flowing in the high voltage conductors 2U, 2V and 2W flow through the eddy current conductors 25 for the reason that the casing 11 is made of non-magnetic stainless steel. As a result, the eddy current flowing in the eddy current conductors 25 having a low electrical resistance does not cause any temperature increase.

Figure 10:
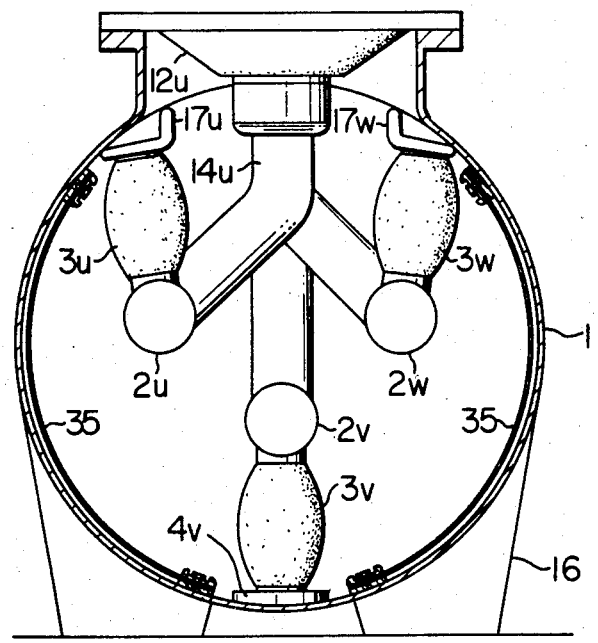

A three-phase combined type gas insulated bus according to still another embodiment of the present invention is shown in FIG. 10. The mounting structure of this gas insulated bus is simplified by reducing the number of eddy current conductors.

The high voltage conductor 2V is supported by an insulating support 3V as in the preceding embodiment. The high voltage conductors 2U and 2W, on the other hand, are supported by insulating supports 3U and 3W respectively disposed substantially in parallel to the insulating support 3V for the high voltage conductor 2V. Those ends of the insulating supports 3U and 3W opposite to the ends thereof supporting the high-voltage conductors 2U and 2W respectively are secured to metal holders 17U and 17W respectively, which metal holders 17U and 17W are welded or secured by other appropriate means to the inner wall of the casing 1. By arranging the insulating supports in this way, the structure of the eddy current conductors 35 can be concentrated into two parts. The eddy current conductors 35 are constructed of copper or aluminum. The eddy current conductor 35 arranged between the insulating supports 3U and 3V is for passing the eddy current caused by the current flowing in the high voltage conductors 2U and 2V, while the eddy current conductor 35 interposed between the insulating supports 3V and 3W is for passing the eddy current caused by the current flowing through the high voltage conductors 2V and 2W.

According to the embodiment under consideration, the two eddy current conductors 35 may be constructed substantially in the same shape. The holders 17U and 17W are placed at a distance from the branch conductor 14U in the direction of the axis of the high voltage conductors, thus securing a predetermined insulation distance from the branch conductor 14U.

Figure 11:
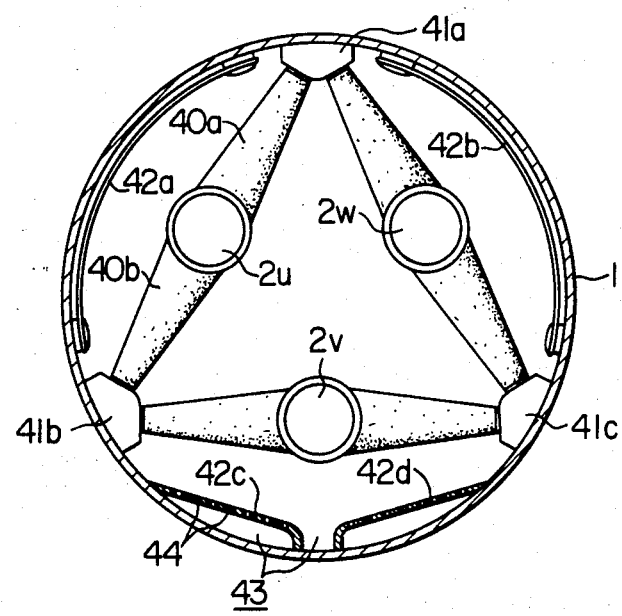

A three-phase combined type gas insulated bus according to a further embodiment is shown in FIG. 11. In this embodiment, the high voltage conductor of each phase such as the high voltage conductor 2U for U phase is supported by the insulating bars 40a and 40b from two directions. Seats 41a, 41b and 41c are secured on the inner surface of the casing 1. An end of each of the insulating bars 40a and 40b is secured to the high voltage conductor 2U, and the other end thereof is secured to a respective one of the seats 41a, 41b. The three-phase high voltage conductors 2U, 2V and 2W are positioned at apexes of a smaller triangle each of which is located at a center of each side of a larger triangle each side of which is formed substantially by a pair of the insulating bars.

As described above, the feature of the three-phase combined type gas insulated bus of this construction lies in the structure of the eddy current conductors. The eddy current conductors 42a and 42b interposed between the seats 41a and 41b and between 41a and 41c respectively are substantially identical to those mentioned in the preceding embodiment. The eddy current conductors 42c and 42d arranged between the seats 41b and 41c, however, are different from the remaining eddy current conductors. The conductors 42c and 42d basically make up particle trap means which function as an eddy current conductor at the same time. The particle trap means forms an inclination of the electric field between a high voltage conductor impressed with a high voltage and a casing at the earth potential, so that the conductive foreign matters staying in the casing are introduced to a weaker electric field thereby to trap them. Each of the two eddy current conductors 42c and 42d has part thereof bent away from the high voltage conductor 2V and includes a plurality of pitfalls 44. The bent parts of eddy current conductors 42c and 42d are in opposed relation to each other. A weak electric field is formed between the bent parts and on the back sides of the conductors. The conductive foreign matters remaining in the casing 1 are trapped by the weak electric field 43. It should be noted that the eddy current conductors 42c and 42d have an additional function other than that of a particle trap. A mere particle trap can be a conductor for controlling an electric field. The conductors 42c and 42d, however, are required to be constructed of a material of good electrical conductivity having an electrical resistance smaller than the casing 1. This requirement is satisfied by use of such a material as aluminum or copper.

Figure 12:
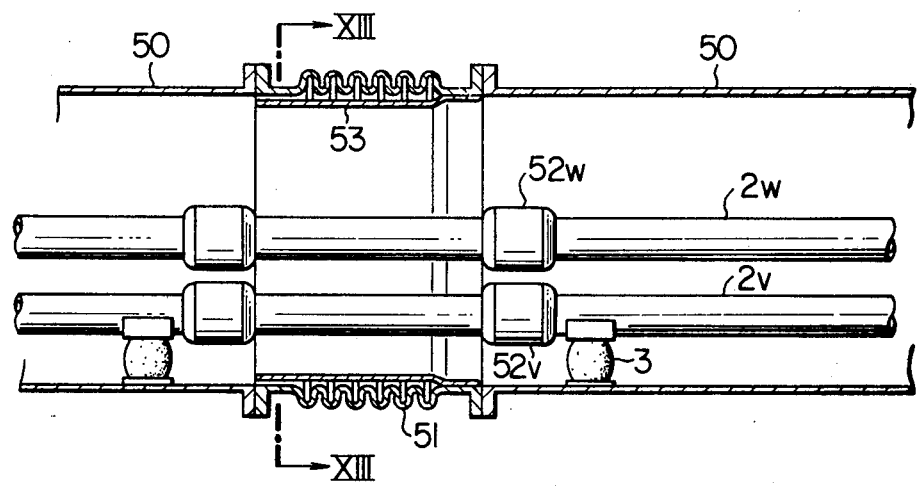
Figure 13:
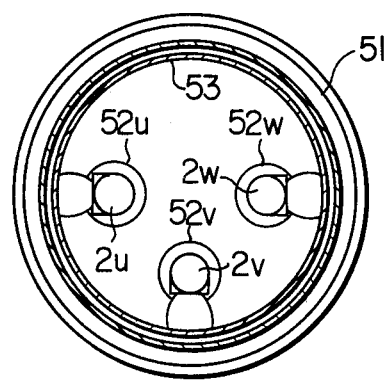
FIG. 13 is a sectional view taken along the line XIII—XIII in FIG. 12.

A three-phase combined type gas insulated bus according to a still further embodiment is shown in FIGS. 12 and 13.

In this embodiment, the sealed casing is comprised of a cylindrical metal casing 50 and a bellows 51 coupled in series with each other. The high voltage conductors 2U, 2V and 2W, the insulating supports 3 and the like arranged in the sealed casing are the same as those in the aforementioned embodiment. This embodiment is greatly different from the other embodiments in that in this embodiment the casing 50 is made of aluminum and the bellows 51 is constructed of stainless steel. This obviates the problem of temperature increase of the casing 1. In spite of this, since the bellows 51 is made of stainless steel for the reason of manufacturing techniques, there is posed the same problem as in the casings in the preceding embodiments. In order to overcome this problem, a cylindrical eddy current conductor 53 made of copper or aluminum is arranged within the bellows 51. For the same reason as in the case of the aforementioned embodiments, the problem of temperature increase of the bellows 51 is thus solved. Further, the eddy current conductor 53, which is in cylindrical form, also functions as an electric field shield against the wavy protrusions of the bellows 51. The high voltage conductors have contact means 52U, 52V and 52W, so that by compressing the bellows 51, the high voltage conductors between the particular contact means are separated, thus making it possible to remove the other casing 50. In this case, the eddy current conductor 53 has only one end thereof fixed and the other end kept free, and therefore poses no stumbling block.

We claim:

1. A three-phase combined type gas insulated electrical apparatus comprising:
   a cylindrical metal sealed casing filled with an insulating gas,
   three high voltage conductors for a three-phase alternating current arranged at positions corresponding to the apexes of a triangle having two sides of equal length and one side of a length which is different from that of said two sides,
   insulating support means for supporting each of said high voltage conductors and electrically insulating said conductors from said sealed casing, and
   eddy current conductor means of good electrical conductivity for passing an eddy current caused by a magnetic field having a component perpendicular to the surface of said sealed casing and induced by current flowing in said high voltage conductors, said eddy current conductor means being secured in the vicinity of the inner wall of said sealed casing and having a longitudinal gap at least in a portion thereof facing said one side of the triangle, whereby said eddy current conductor means is discontinuous circumferentially of said casing so as to be located in areas of the casing facing at least portions of said two sides of the triangle.

2. A three-phase combined type gas insulated electrical apparatus according to claim 1, wherein said sealed casing is constructed of a material higher in electrical resistance than said eddy current conductor means.

3. A three-phase combined type gas insulated electrical apparatus according to claim 2, wherein said eddy current conductor means is made of a material selected from the group consisting of aluminum and copper and said sealed casing is made of steel.

4. A three-phase combined type gas insulated electrical apparatus according to claim 1, wherein each insulating support means is made of an insulating member in the form of a rod, and the axis thereof is arranged substantially along the diameter of said sealed casing, said insulating support means having an end thereof secured to the inner wall of said sealed casing, said eddy current conductor means comprising conductors located between the secured ends of said insulating rods supporting said high voltage conductors of at least a given two phases.

5. A three-phase combined type gas insulated electrical apparatus according to claim 4, wherein each insulating rod is fixedly supported on a seat secured to the inner wall of said sealed casing, said conductors of said eddy current conductor means being fixed over said seats associated with said conductors of said given two phases.

6. A three-phase combined type gas insulated electrical apparatus according to claim 1, wherein said eddy current conductor means includes a plate-shaped member with an open central portion.

7. A three-phase combined type gas insulated electrical apparatus comprising:
   a cylindrical sealed metal casing filled with an insulating gas,
   three high voltage conductors for three-phase alternating current arranged at positions corresponding to apexes of a triangle within said sealed casing,
   branch conductors for the respective three phases, each having an end thereof connected to a corresponding one of said high voltage conductors, said branch conductors being led out of said sealed casing in one direction,
   insulating support means arranged substantially in parallel to the direction of leading of said branch conductors for respective phases, said insulating support means electrically insulating said high voltage conductors for respective phases from said sealed casing and securing said high voltage conductors to the inner wall of said sealed casing, and
   eddy current conductors made of a material of good electrical conductivity for passing an eddy current, each of said eddy current conductors being secured between one of said insulating support means substantially aligned with said direction of leading of the branch conductors and the remaining two of said insulating support means, respectively, each of said eddy current conductors being secured in the vicinity of the inner wall of said sealed casing.

8. A three-phase combined type gas insulated electrical apparatus according to claim 7, wherein said eddy current conductors are made of a material selected from the group consisting of aluminum and copper and said sealed casing is made of a material larger in electrical resistance than said eddy current conductors.

9. A three-phase combined type gas insulated electrical apparatus according to claim 7, wherein each of said eddy current conductors is a plate-shaped member with an open central portion.

10. A three-phase combined type gas insulated electrical apparatus comprising:
    a cylindrical sealed metal casing of aluminum filled with an insulating gas,
    bellows means connected in series with said sealed casing,
    three high voltage conductors for three-phase alternating current arranged at positions corresponding to apexes of a triangle within said sealed casing and within said bellows means,
    insulating support means for supporting and insulating electrically said high voltage conductors for respective phases from said sealed casing and said bellows means, and
    an eddy current conductor arranged in the vicinity of the inner wall of said bellows means for passing an eddy current caused by a magnetic field having a component perpendicular to said bellows means, which is induced by current flowing in said high voltage conductors.

11. A three-phase combined type gas insulated electrical apparatus according to claim 10, wherein said eddy current conductor is cylindrically formed and arranged in said sealed casing.

12. A three-phase combined type gas insulated electrical apparatus according to claim 10, wherein said bellows means is made of stainless steel and said eddy current conductor is made of a material smaller in electrical resistance than said stainless steel.

* * * * *

UNITED STATES PATENT AND TRADEMARK OFFICE
CERTIFICATE OF CORRECTION

PATENT NO. : 4,458,099
DATED : July 3, 1984
INVENTOR(S) : Susumu TAKEUTI, ET AL.

It is certified that error appears in the above-identified patent and that said Letters Patent is hereby corrected as shown below: On the title page, Item [75] should read:

Inventors: Susumu Takeuti; Minoru Sakaguchi;
Takanobu Aoyama; Kazuaki Oishi;

Signed and Sealed this

Twenty-eighth Day of May 1985

[SEAL]

*Attest:*

DONALD J. QUIGG

*Attesting Officer*     *Acting Commissioner of Patents and Trademarks*